United States Patent [19]
Bushnell et al.

[11] 3,779,811
[45] Dec. 18, 1973

[54] MATRIX-TYPE FUEL CELL

[75] Inventors: Calvin L. Bushnell, South Glastonbury; James K. Stedman, Glastonbury, both of Conn.

[73] Assignee: United Aircraft Corporation, East Hartford, Conn.

[22] Filed: Mar. 16, 1971

[21] Appl. No.: 124,862

[52] U.S. Cl.............................. 136/86 R
[51] Int. Cl. ........................ H01m 27/02
[58] Field of Search...................... 136/86

[56] References Cited
UNITED STATES PATENTS

| | | | |
|---|---|---|---|
| 3,442,712 | 5/1969 | Roberts, Jr.................. | 136/86 R |
| 3,507,702 | 4/1970 | Sanderson.................. | 136/86 C |
| 3,370,984 | 2/1968 | Platner...................... | 136/86 C |
| 3,418,168 | 12/1968 | Wentworth................. | 136/86 R |

Primary Examiner—Allen B. Curtis
Attorney—Brufsky, Staas, Breiner & Halsey

[57] ABSTRACT

A compact electrochemical cell is described comprising an anode, a cathode, a matrix containing an ion-conductive electrolyte between the anode and cathode, and porous metal plates containing porous pins positioned adjacent each of said anode and cathode in order that the pins of the plates are in contact with said anode and cathode over the limited surface area of the pins. The electrolyte volume of the cell is controlled by electrolyte movement through the pins of the porous plate, thereby stabilizing the electrochemical performance of the cell.

10 Claims, 2 Drawing Figures

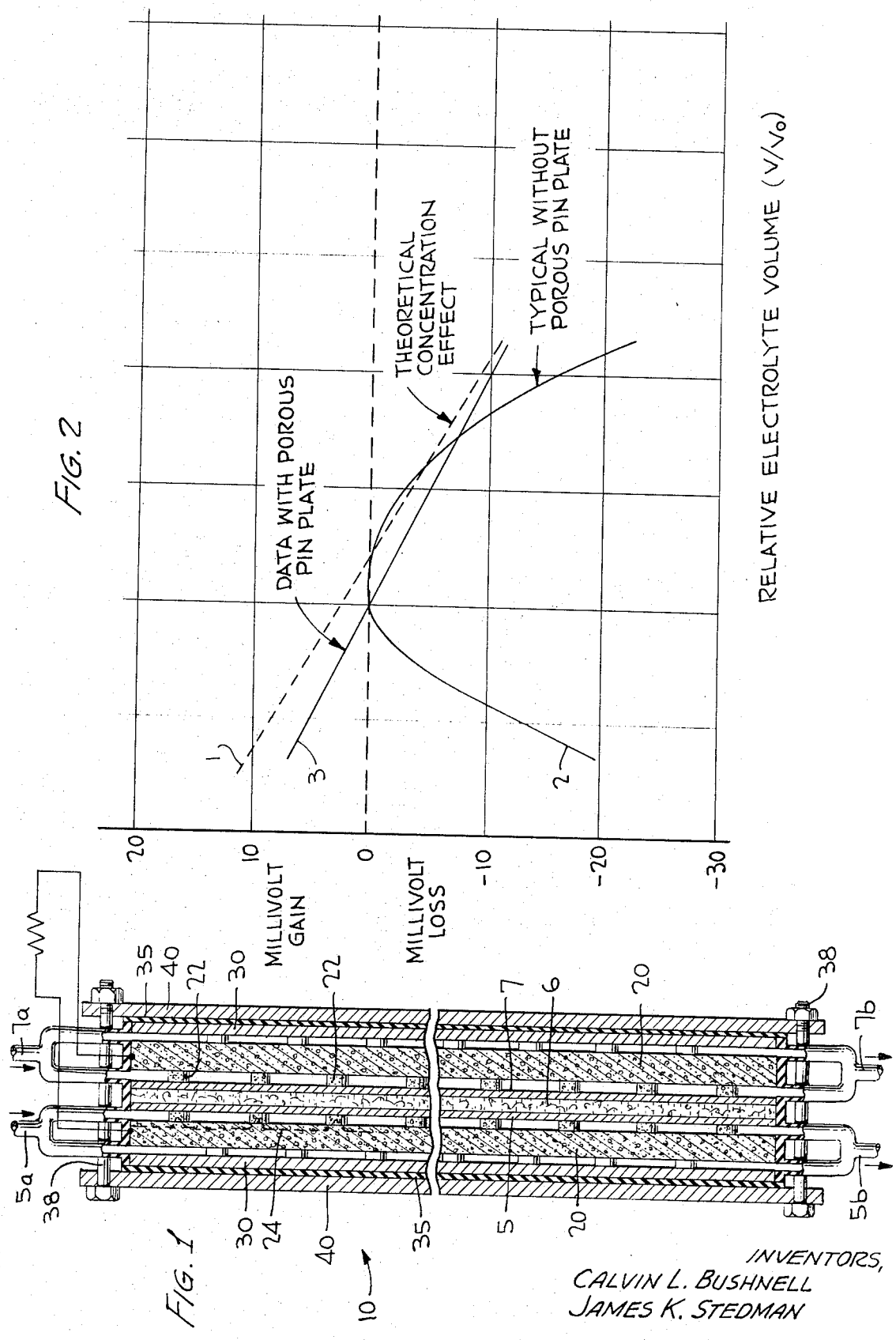

MATRIX-TYPE FUEL CELL

FIELD OF INVENTION AND BACKGROUND

This invention relates to electrochemical cells and, more particularly, to an improvement in an electrochemical cell utilizing an electrolyte contained in, or trapped in a matrix between the electrodes of a cell whereby the volume of the electrolyte is controlled, stabilizing cell performance. For convenience, hereinafter the invention will be described with reference to a fuel cell for the direct generation of electricity utilizing two non-consumable electrodes. As will be apparent, however, similar considerations governing the use of the invention in such cells will apply to other electrochemical devices such as electroylzers enabling its use in such devices.

A fuel cell, as the term is employed herein, designates an electrochemical cell for the direct production of electrical energy from a fuel and oxidant. With such cells, it is not necessary to go through the usual conversion of chemical energy to heat energy to mechanical energy to electrical energy as is common with heat engines. Such cells in their most simplified design comprise a housing, an oxidizing electrode, a fuel electrode, and an electrolyte. In operation, it is necessary that the fuel and oxidant contact a surface of their respective electrode where a process of adsorption and de-adsorption occurs leaving the electrodes electrically charged, with the second surface of the electrodes being in contact with the electrolyte. Depending upon the nature of the electrolyte, ions are transferred through the electrolyte from the anode to the cathode, or from the cathode to the anode. Electrical current is withdrawn from the cell and passed through a suitable load where work is accomplished.

Although the electrolyte can be a solid, a molten paste, a free-flowing liquid, or a liquid trapped in a matrix, as a result of design considerations including compactness and the desire to have a limited number of controls and ancillary equipment, cells utilizing a liquid electrolyte trapped in a hydrophilic matrix are preferred for many applications. A problem of such cells, however, is the change in electrolyte volume in the matrix as a result of water being formed by the interaction of the fuel and oxidant and/or as a result of electrolyte loss through excessive heating of the cell or use of dry reactants during operation of the cell. In instances where the electrolyte is increased, the excess electrolyte is carried by capillary action into the electrodes of the cell with resultant flooding of the electrodes. In instances where the volume of electrolyte is decreased, dry-out will occur at the electrolyte matrix-electrode interface. Such flooding and/or dry-out adversely affects the electrochemical performance of the cell.

In the prior art, to compensate for the change in electrolyte volume in a trapped electrolyte cell, the use of electrodes comprising a sintered metal — normally 30 to 50 mils thick — has been suggested. The thick metal sinter is to compensate for the increase in volume of the electrolyte during operation of the cells. As readily apparent, however, the aforesaid solution cannot compensate for dry-out; and, furthermore, the thick electrodes with the changing electrolyte interface caused high and fluctuating IR loss across the cell varying the electrical performance of the cell. Obviously, the use of thick electrodes resulted in relatively thick or bulky cells.

OBJECTS OF THE INVENTION AND GENERAL DESCRIPTION

Accordingly, a primary object of the present invention is to provide a cell design which separates the volume tolerance function from the electrochemical function of the cell.

Another object of the present invention is to provide a matrix-type fuel cell which permits convenient removal of excess liquid, preventing flooding of the electrodes.

Another object of this invention is to provide a matrix-type fuel cell which permits convenient replenishing of electrolyte, preventing matrix/electrode dry-out.

Another object of this invention is to provide a matrix-type fuel cell having an electrolyte reservoir which will automatically control the electrolyte volume in the cell matrix.

Another object of this invention is to provide a matrix-type fuel cell having improved cell spacing.

Another object of this invention is to provide a matrix-type fuel cell having a low IR loss.

These and other objects of the invention will be more readily apparent from the following detailed description, with particular emphasis being placed on the embodiment illustrated in the drawing.

In accordance with the present invention, a matrix-type fuel cell is constructed which incorporates a porous plate having a series or plurality of porous pins or ridges behind either one of the anode or cathode, or behind both the anode and cathode. The porous pins or ridges are in contact with the electrode or electrodes of the cell. The electrolyte from the electrolyte matrix floods these pins and is free to move back and forth between the porous plate and cell matrix through the electrode as the electrolyte volume changes. Accordingly, the electrolyte volume of the electrochemical cell is always constant, avoiding fluctuations in the cell performance as a result of electrolyte volume change. More specifically, as the electrolyte within the cell increases as a result of water formation during the cell reaction, the amount of electrolyte in the porous plate will increase; or if the electrolyte decreases as a result of excessive heat or reactant flow, electrolyte will flow from the porous plate to the matrix, decreasing the electrolyte in the porous plate. However, the electrolyte within the cell matrix will remain constant. Effectively, therefore, the porous back-up plate will function as a reservoir feeding electrolyte to the electrolyte matrix on demand, or withdrawing or removing electrolyte from the matrix as it is formed.

In operation of the cell, the reactant gas will be passed to the electrodes between the porous back-up plate and the electrode. The gaseous reactant will be interrupted as a result of the pins and/or ridges on the porous plate, improving reactant circulation and reactant contact with the electrode. The porous plate will also function as the current collector for the electrode. If desired, in the event the operating conditions of the cell are such that electrolyte build-up beyond the capacity of the porous plate is likely, a cooling plate can be placed behind the porous plate and a cooling gas circulated between the cooling plate and porous plate to remove excess water as it is formed. On the other hand, in the event operating conditions of the cell are such that the electrolyte will need to be replenished, moisture can be added to the porous plate and, thus to the cell matrix, by feeding electrolyte or water to the back of the porous plate either as a vapor or as a liquid. Effectively, therefore, in accordance with the present invention, the electrolyte volume of the cell is maintained constant, assuring stability of cell performance.

THE DRAWING AND SPECIFIC EMBODIMENT

In order to more specifically demonstrate the present invention, reference is made to the accompanying drawing wherein FIG. 1 is a transverse sectional view through a single fuel cell constructed in accordance with the present invention; and FIG. 2 is a graph illustrating electrolyte volume tolerances of a matrix-type fuel cell.

Referring to FIG. 1 of the drawing, the fuel cell 10 comprises anode 5 and cathode 7 separated by an electrolyte matrix 6. In the embodiment shown, electrodes 5 and 7 are lightweight screen electrodes comprising a conductive nickel screen embedded in a uniform admixture of catalytic metal, in this instance platinum, and polytetrafluoroethylene particles. Th ratio of platinum to polytetrafluoroethylene on a volume basis is 3:7, with the platinum loading of the electrode being 15mg/cm$^2$. The electrodes are approximately 10 mils in thickness. The electrolyte matrix is pressed asbestos and is approximately 25 mils thick. A porous plate 20 having a plurality of porous pins 22 is adjacent to and in communication with each of the anode and cathode through pins 22. In the preferred embodiment shown, the plate is porous nickel having a total porosity of about 80 percent. As apparent from the drawing, each of the porous plates is adjacent to a cooling plate 30. Cooling plates 30 are separated from pressure plates 40 by insulation 35 and the entire cell assembly held together with threaded tie rods 38.

In operation, electrolyte matrix 6 is saturated with a 30 percent aqueous potassium hydroxide electrolyte through air inlet plug, not shown. Sufficient electrolyte is added in order that the electrolyte will pass into porous pins 22 and partially into porous plate 20. A possible electrolyte interface is shown by dotted line 24 in plate 20 behind anode 5. A reactant gas, in this instance hydrogen, is fed to anode 5 through gas inlet 5a, with excess gas being removed through outlet 5b. An oxidant, in this instance air, is fed to cathode 7 through inlet 7a, with excess air and impurities being vented through exit 7b. Depending upon the current characteristics and operating conditions of the cell, it may be desirable to cool the cell by passing a cooling gas, i.e., air, or a cooling liquid such as ethylene glycol, propylene glycol, or glycerine between cooling plate 30 and end plate 40 through a channel, not shown.

Although in the embodiment shown in the drawing porous plates and cooling plates are shown behind each of the electrodes, it can be desirable in order to conserve space to only have the porous nickel plate and cooling plate behind one of the anode or cathode with the electrolyte volume in the matrix being controlled through this single unit. As will be readily apparent, again depending upon operating conditions, i.e., where the current drain is relatively low and the operating temperatures of the cell are constant, it may not be necessary to utilize a cooling plate at all. This, as will be apparent, will substantially save on the total weight of the cell and, further, will provide a more compact cell.

The cell when operated at a constant current drain will provide a substantially constant cell output. There is little fluctuation in the current characteristics of the cell since the entire volume tolerance function is separated from the electrochemical function because of the use of the porous pin plates. This is shown graphically in FIG. 2 of the drawing. From the graph it is seen that the electrochemical output of the presently disclosed cell is substantially identical to the output which is theoretically obtainable with a matrix-type cell. Note lines 1 and 3. In contradistinction, without the porous pin plate, the current characteristics of a matrix cell are changed substantially at both low and high electrolyte volumes as a result of the varying electrolyte interface in the electrodes and the varying effective electrochemical area of the cell electrodes. Accordingly, the advantages of the present system are readily apparent.

Although the present invention has been described with reference to lightweight electrodes comprising a metal support screen embedded in a catalytic mixture of metal and hydrophobic plastic binder, other electrodes can be employed including non-porous palladium/silver alloy structures as described in U.S. Pat. No. 3,092,517. Furthermore, the so-called Bacon-type electrode as defined in U.S. Pat. No. 2,716,670 can also be employed. Although it is indicated that the electrolyte matrix is made of asbestos, other hydrophilic matrices including ceramic materials and polymeric materials cn be utilized. In addition to nickel, the porous back-up plate — made by any conventional technique — can be any material which is hydrophilic, i.e., will collect water as a result of capillary action, and includes porous copper, tantalum, iron, and the like. As a result of availability and over-all characteristics, nickel is preferred. The porosity of the plate can vary as long as it is sufficiently porous to adsorb water through capillary action, but preferably the plate will have a porosity of from about 35 to 90 percent. The operating temperature of the cell can vary as long as it is not above the critical temperature of the electrodes and/or electrolyte matrix being employed. Preferably, the operating temperature of matrix-type cells of the type described herein will range from about 20° to 175° C. In addition to the potassium hydroxide electrolyte disclosed hereinbefore, other commonly employed aqueous electrolytes exemplified by aqueous solution of the alkali hydroxides, alkaline earth hydroxides, and carbonates, as well as strong acid electrolytes such as hydrochloric acid, sulphuric acid, and phosphoric acid can be employed. Commonly employed reactants, in addition to hydrogen and oxygen, can be utilized in the cells of the present invention. As will be apparent, the concept of the present invention can be employed in any of the prior art cells where electrolyte volume control within a matrix-type electrolyte is essential.

Furthermore, although the present invention is described and illustrated in the drawing with reference to a single cell, it should be apparent that in preferred constructions a plurality of cells will be stacked together; and where cooling is not necessary, the porous metal plates can have the porous pins or ridges on both sides and serve electrodes of adjacent cells. This will increase the compactness of a battery of cells. Alternatively, if cooling is necessary, a single cooling chamber can be positioned between two porous plates, with the cooling chamber servicing the two porous plates which are in contact with electrodes of opposite cells. As will be apparent to those skilled in the art, various modifications can be made in the over-all design to meet operating conditions. For example, a stack of cells employing the concept of this invention can be utilized with a humidity exchange/scrubber unit of the type defined in commonly assigned U.S. Pat. No. 3,411,951. These modifications being within the ability of one skilled in the art are to be covered herein with the invention only being limited in accordance with the appended claims.

It is claimed:

1. A fuel cell having a pair of opposed electrodes, an electrolyte matrix positioned between said pair of electrodes, a self-sustaining porous plate having a plurality of porous projections positioned behind at least one of said pair of electrodes and in contact with said one electrode over the entire surface area of said projections; said matrix and said porous plate containing an aqueous electrolyte and being in electrolyte communication with each other through said electrode at the area at which said plurality of projections contact said electrode, said electrolyte filling less than the entire volume of said porous plate, whereby the electrolyte volume of said matrix is maintained constant.

2. The fuel cell of claim 1 including a back-up plate behind said porous plate, said back-up plate and porous plate forming a gas coolant chamber therebetween, and reactant-fed means for feeding reactant to both sides of said porous plate.

3. The fuel cell of claim 1 having a porous plate behind each of said pair of electrodes.

4. The fuel cell of claim 3 wherein said porous plate is porous nickel having a porosity of from about 35 to 80 percent.

5. The fuel cell of claim 4 wherein said projections of said porous plate are pins.

6. The fuel cell of claim 5 wherein said pair of electrodes are lightweight screen electrodes comprising a support screen in contact with a catalyst mix of electrocatalyst and hydrophobic polymer binder.

7. The fuel cell of claim 6 wherein said binder is polytetrafluoroethylene.

8. The fuel cell of claim 7 wherein the electrolyte is an aqueous alkali hydroxide.

9. A fuel cell having a pair of opposed electrodes, an electrolyte matrix positioned between said pair of electrodes, a self-sustaining porous plate having a plurality of porous projections positioned behind at least one of said pair of electrodes and in contact with said one electrode over the entire surface area of said projections; said matrix and said porous plate containing an aqueous electrolyte and being in electrolyte communication with each other through the electrode surface area at which said plurality of projections contact said electrode, said electrolyte completely filling said matrix and filling less than the entire volume of said porous plate whereby the electrolyte volume of said matrix is maintained constant, a back-up plate positioned behind said porous plate which together with said porous plate forms a passage between said porous plate and back-up plate, and means for feeding a gaseous reactant simultaneously between said porous plate and said one electrode and between said back-up plate and said porous plate.

10. The fuel cell of claim 9 wherein porous plates are positioned behind each of said pair of electrodes and said plates are electrically connected to an external circuit for withdrawing electrical energy from said cell electrodes.

* * * * *